United States Patent
Mutikainen

(10) Patent No.: US 9,137,711 B2
(45) Date of Patent: Sep. 15, 2015

(54) METHOD AND APPARATUS FOR IMPLEMENTING A WAIT PERIOD FOR SINGLE RADIO CONTINUITY TRANSFERS

(75) Inventor: Jari Kalevi Mutikainen, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 624 days.

(21) Appl. No.: 13/520,879

(22) PCT Filed: Jan. 11, 2010

(86) PCT No.: PCT/IB2010/050089
§ 371 (c)(1),
(2), (4) Date: Jul. 6, 2012

(87) PCT Pub. No.: WO2011/083371
PCT Pub. Date: Jul. 14, 2011

(65) Prior Publication Data
US 2013/0122907 A1 May 16, 2013

(51) Int. Cl.
*H04W 36/00* (2009.01)
(52) U.S. Cl.
CPC ...... *H04W 36/0022* (2013.01); *H04W 36/0055* (2013.01)
(58) Field of Classification Search
CPC ................................................ H04W 36/0022
USPC ............ 455/436, 456.1–456.6; 370/252, 236, 370/237, 238, 508
See application file for complete search history.

(56) References Cited

U.S. PATENT DOCUMENTS

| 5,987,430 A * | 11/1999 | Van Horne et al. ............. 705/34 |
| 7,180,868 B1 | 2/2007 | Tiihonen et al. |
| 7,877,101 B1 * | 1/2011 | Chhabra .................... 455/456.3 |
| 2006/0120171 A1 | 6/2006 | Touati et al. |
| 2008/0014943 A1 | 1/2008 | Ahn et al. |
| 2009/0003227 A1 * | 1/2009 | Malomsoky et al. ......... 370/252 |
| 2009/0086674 A1 | 4/2009 | Ejzak |

FOREIGN PATENT DOCUMENTS

| CN | 101351039 A | 1/2009 |
| CN | 102474783 A | 5/2012 |
| WO | 2010/090568 A1 | 8/2010 |

OTHER PUBLICATIONS

"3rd Generation Partnership Project; Technical Specification Group Services and System Aspects; Single Radio Voice Call Continuity (SRVCC) Enhancements; Stage 2 (Release 10)", 3GPP TR 23.856, V0.1.0, Sep. 2009, pp. 1-13.

(Continued)

*Primary Examiner* — Michael T Vu
(74) *Attorney, Agent, or Firm* — Alston & Bird LLP

(57) ABSTRACT

Various methods for implementing a wait period for single radio continuity transfers are provided. One example method includes obtaining a timer value, where the timer value is based on a communications delay to a far end device. The communications delay to the far end device may be determined during session establishment with the far end device. The example method also includes implementing a wait period for a duration of the timer value, and, in response to completion of the wait period, triggering a single radio continuity network transfer. Similar and related example methods and example apparatuses are also provided.

18 Claims, 3 Drawing Sheets

(56) References Cited

OTHER PUBLICATIONS

"3rd Generation Partnership Project; Technical Specification Group Core Network and Terminals; Inter-IMS Network to Network Interface; (Release 8)", 3GPP TS 29.165, V8.3.0, Sep. 2009, pp. 1-19.

"3rd Generation Partnership Project; Technical Specification Group Services and System Aspects; Single Radio Voice Call Continuity (SRVCC); Stage 2 (Release 8)", 3GPP TS 23.216, V8.5.0, Sep. 2009, pp. 1-35.

International Search Report and Written Opinion received for corresponding International Patent Application No. PCT/IB2010/050089, dated Oct. 8, 2010, 14 pages.

Office action received for corresponding Chinese Patent Application No. 201080061182.3, dated Feb. 10, 2015, 4 pages of Office Action, No English Language Translation available.

Office action received for corresponding Chinese Patent Application No. 201080061182.3, dated Jun. 5, 2014, 8 pages of Office Action, No English Language Translation available.

"Alt-E Clean-Up", 3GPP TSG SA WG2 Meeting #62, TD S2-080236, Agenda Item: 8.7, Jan. 14-18, 2008, pp. 1-8.

"Alternative E Enhancements", 3GPP TSG SA WG2 Meeting #63, TO S2-081361, Agenda Item: 8. 7.1, Feb. 18-22, 2008, pp. 1-11.

\* cited by examiner

METHOD AND APPARATUS FOR IMPLEMENTING A WAIT PERIOD FOR SINGLE RADIO CONTINUITY TRANSFERS

RELATED APPLICATION

This application was originally filed as PCT Application No. PCT/IB2010/050089 filed Jan. 11, 2010.

TECHNICAL FIELD

Embodiments of the present invention relate generally to wireless communications technology, and, more particularly, relate to a method and apparatus for implementing a wait period for single radio continuity transfers.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. The functionality of mobile communications devices continues to expand and, as a result, mobile and wireless communications device have likely become a necessity in both business and personal settings. As the functionally of mobile communications devices and the ease of information transfer continues to increase, users continue to demand more functionality that allows the users to quickly find and interact with, and communicate information in unique ways.

Although the technology of wireless communications continues to evolve, the physical infrastructure may not be developed as the same pace. As such, in some situations, devices that utilize new evolved technology must be backwards compatible with older technologies that are still utilized. In some instances, issues can arise when a device, such as a mobile terminal, attempts to transition from a network with infrastructure that supports newer technology (e.g., packet switched technology) to a network with infrastructure that supports older technology (e.g., circuit switching technology).

BRIEF SUMMARY

Example methods and example apparatuses are described herein that provide for implementing a wait period for single radio continuity transfers. In this regard, due to lag time associated with messaging within a wireless communications network, a local device may transition to another domain or network via a single radio continuity transfer, having been assigned a new address (e.g., internet protocol address), before a far end device is aware of the transition. As a result, in some instances, the far end device may be attempting to conduct communications with the local device using an expired address. To avoid this outcome, various example embodiments, account for the communications delay associated with the far end device and synchronize the occurrence of the transition at both the local device and the far end device.

According to various example embodiments, solutions for synchronizing the transfer are provided that involve no changes to the functionality of user equipment involved in the transfer or architectural changes to the network configuration. According to various example embodiments, solutions for synchronizing the transfer are provided that also introduce minimal impacts on the duration of a single radio continuity transfer.

Various example methods and apparatuses of the present invention are described herein, including example methods that provide for implementing a wait period for single radio continuity transfers. One example method includes obtaining a timer value, where the timer value is based on a communications delay to a far end device. The communications delay to the far end device may be determined during session establishment with the far end device. The example method may also include implementing a wait period for a duration of the timer value, and in response to completion of the wait period, triggering a single radio continuity network transfer.

An additional example embodiment is an apparatus configured for implementing a wait period for single radio continuity transfers. The example apparatus comprises at least one processor and at least one memory including computer program code, the at least one memory and the computer program code configured to, with the at least one processor, cause the apparatus to perform various functionality. The example apparatus may be caused to perform obtaining a timer value, where the timer value is based on a communications delay to a far end device. The communications delay to the far end device may be determined during session establishment with the far end device. The example apparatus may also be caused to perform implementing a wait period for a duration of the timer value, and in response to completion of the wait period, triggering a single radio continuity network transfer.

Another example embodiment is computer program product comprising a computer-readable storage medium having computer program code stored thereon, wherein execution of the computer program code causes an apparatus to perform various functionalities. Execution of the computer program code may cause an apparatus to perform obtaining a timer value, where the timer value is based on a communications delay to a far end device. The communications delay to the far end device may be determined during session establishment with the far end device. Execution of the computer program code may also cause the apparatus to perform implementing a wait period for a duration of the timer value, and in response to completion of the wait period, triggering a single radio continuity network transfer.

Another example apparatus includes means for obtaining a timer value, where the timer value is based on a communications delay to a far end device. The communications delay to the far end device may be determined during session establishment with the far end device. The example apparatus may also include means for implementing a wait period for a duration of the timer value, and means for triggering a single radio continuity network transfer in response to completion of the wait period.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
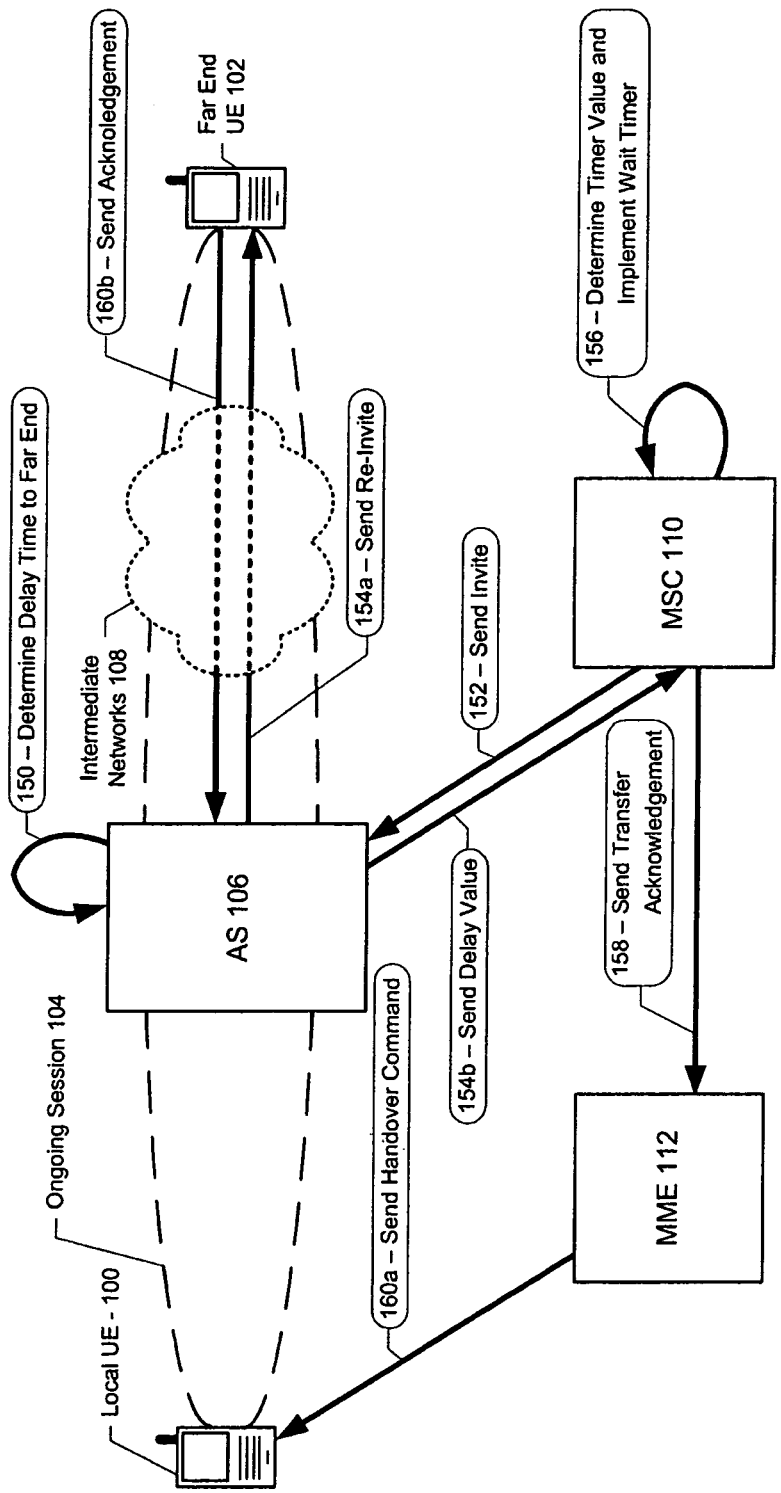
FIG. 1 illustrates an example system and example method for implementing a wait period for single radio continuity transfers example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Various example embodiments of the present invention support a relatively seamless transition between two domains or networks when a single radio continuity transfer, such as single radio voice call continuity (SRVCC) transfer. Transfers of this type often involve user equipment (UE), such as a mobile terminal, transferring from a circuit switched domain, such as a GSM (global system for mobile communications) EDGE (enhanced data rates for GSM evolution) radio access network (GERAN) or UMTS (universal mobile telecommunications system) terrestrial radio access network (UTRAN) domain, to a packet switched domain or vice versa. Packet switched domains, such as those configured in accordance with $3^{rd}$ generation high speed packet access (HSPA), evolved UTRAN (EUTRAN), and long term evolution (LTE), have been designed to support voice and data communications via an internet protocol multimedia subsystem (IMS). In this regard, an IMS domain may be type of packet switched domain. Transfers from packet switched domains, such as these, to circuit switched domains may be managed via a session continuity control application server (SCC AS).

For example, a local UE may be party to an ongoing communications session with a far end UE in a packet switched domain. The local UE may (e.g., due to movement of the local UE) need to be transferred, for example, from the packet switched domain to a circuit switched domain. Prior to the transfer (also referred to as a handover) to the circuit switched domain, an IMS access leg connection may be established with an SCC AS. Additionally, in preparation for the transfer, a circuit switched core network entity (e.g., a mobile switching center (MSC) server) may also establish a packet switched access leg (e.g., via voice over IP (VoIP)) with the SCC AS and the local UE may establish a circuit switched leg to between the UE and the MSC. The circuit switched core network entity may generate an invitation message to the far end UE, that is routed through the SCC AS to notify the far end UE of the transfer and provide an updated address for the local UE. The circuit switched core network entity may also generate and transmit a message that triggers the local UE to perform the transfer. The message triggering the local UE may be in the form of a transfer acknowledgement to a mobility management entity (MME), which, in turn provides a handover command via a radio network (e.g. EUTRAN) to the local UE. The SCC AS may subsequently facilitate the transfer of the local UE from the packet switched domain to the circuit switched domain.

Transfers, such as the one described briefly above, may involve the far end device (e.g., far end UE, media gateway control function (MGCF) server, or the like) being informed of the transfer via the remote leg connection or other connection. The far end device may be provided an updated address (e.g., internet protocol address) to be used for communications with the local device (e.g., local UE) subsequent to the transfer. Updating the far end device, in some instances, may have an associated time delay, due to the time associated with propagating a message through the networks and network entities between an MSC server and/or the SCC AS and the far end device. In some instances, the communications delay may range between, for example, 100 milliseconds to over a second, depending on the type of session and the particular scenario.

According to some example embodiments, the communications delay may be defined as the period of time from when an MSC server initiates as IMS domain transfer towards the SCC AS (e.g., via an invitation to the far end device), until the far end device has been updated with a new address for the local device, possibly from the MSC server or media gateway (MGW). For this period of time, in some instances, the far end device may continue to send media and/or other data to the now expired address of the local device. Notification of the access transfer to the local device may not suffer from the same delay, which can result in the period of time where the addressing between the local and far end devices is inconsistent. In some instances, the local device may be prepared to receive media and/or other data via the updated address and the new target access (e.g., via a circuit switched access and the MSC server) within roughly 100 milliseconds. As a result, if the update of the far end device takes longer than the local end transfer, for the differential period of time, the local device may have already transitioned and may not be configured to receive media and/or other data from the far end device. In some instances, the communications delay may increase with each IMS network element that is present in the path. In roaming scenarios and inter-operator calls, additional elements may be involved to further increase the delay, since each network border may have interconnection border control functions (IBCFs) and transition gateways (TrGws) on both sides of a border.

Various example embodiments of the present invention introduce a wait period that provides for synchronizing the transfer of the local device with the notification to the far end device. In this regard, the wait period may be determined based on the communications delay between, for example, an application server and a far end device. The application server may determine (e.g., measure) and provide the communications delay to a switching center server (e.g., MSC server). Based on the communications delay, the switching center server may implement a wait period before triggering the single radio continuity transfer of the local device.

FIG. 1 illustrates an example system and method of the present invention for implementing a wait period for single radio continuity transfers. The system of FIG. 1 includes a local UE 100 (representative of an example local device), a far end UE 102 (representative of an example far end device), an application server (AS) 106, an MSC 110, MME 112, and intermediate networks 108. The local UE 100 may be involved in an ongoing communication session 104 with the far end UE 102. The ongoing communications session 104 may involve the application server 106 and the intermediate networks 108, which may include one or more wired or wireless networks.

The local UE 100 and the far end UE 102 may be any type of user equipment including but not limited to, mobile terminals, set top boxes, and the like. As indicated above, the local UE 100 and the far end UE 102 are merely representative of one type of device that may be party to the ongoing communications session 104 in accordance with various example embodiments of the present invention. For example, in some example embodiments, an MGCF server may take the place of the far end UE 102 in a given scenario. The local UE 100 and the far end UE 102 may be configured to conduct wireless communications in accordance with various communications techniques and standards (e.g., GERAN, UTRAN, E-UTRAN, LTE, WiFi, and the like), and transition between domains that are configured in accordance with those techniques and standards.

The AS 106 may be a network server that supports communications within and between networks and domains. The AS 106 may be embodied as, or implemented by hardware (e.g., processor, memory, etc.) that is part of a communications server or other network node. The AS 106 may be configured to operate as a SCC AS.

The MSC 110 may also be part of a network node (e.g., server), and may be configured to support, among other things, voice calls, short message services, and data transmissions. The MSC 110 may be configured to establish and release end-to-end connections between devices and handle mobility and handovers between networks and domains. According to various example embodiments, the MSC 110 may be configured to support single radio continuity transfers, such as SRVCC transfers. In this regard, the MSC 110 may be a SRVCC MSC. The MSC 110 may be embodied as, or implemented by hardware (e.g., processor, memory, etc.) that is part of a communications server at, for example, a core network entity or other network node.

The MME 112 may also be part of a network node (e.g., server), and may be configured to support, among other things, bearer activation and deactivation and the selection of serving gateways for UEs during handovers and initial attaching to the core network. The MME 112 may be embodied as, or implemented by hardware (e.g., processor, memory, etc.) that is part of a communications server at, for example, a core network entity or other network node.

Via interaction between the entities described above and illustrated in FIG. 1, an example method for implementing a wait period single radio continuity transfers. The example method may begin at 150 where the AS 106 determines a communications delay time to the far end UE 102, referred to as the AS-FE delay. To determine the AS-FE delay, the AS 106 may measure the round trip time (RTT) or the time between the sending of a message to the far end UE 102 and the receipt of a response. Upon determining the communications delay, the AS 106 may store an AS-FE delay value representative of the AS-FE delay. In some example embodiments, rather than storing a value indicative of the round trip delay, the AS 106 may be configured to store a value indicative of a one-way trip delay, or half of the round trip delay as the AS-FE delay value. According to some example embodiments, the AS-FE delay value may be stored, for example, at the MSC 110, rather than the AS 106.

To determine the AS-FE delay, in some example embodiments, when a session initiation protocol (SIP) session is established between the local UE 100 and the far end UE 102, the AS 106 (for the local end) may monitor and store the delays present in the SIP signaling between the devices. For example, when preconditions are used, and the AS 106 may send an UPDATE message towards the far end UE 102, and measure the delay to reception of a 200 OK message for the UPDATE message. Alternatively, when the AS 106 sends the 1xx response with SDP to the far end UE 102, the far end UE 102 may send a response to the AS 106, possibly in the form of a PRACK message, and the AS 106 may measure the delay to the reception of the message.

Alternatively, the AS 106 may be configured to, in response to receiving a 200 OK message for an INVITE message, send the 200 OK message to the far end UE 102, and measure the delay until reception of the ACK message for the 200 OK message. Measuring the delay in this manner may be particularly useful when preconditions are not used. Further, the AS 106 may be configured to send an OPTIONS message to the far end UE 102 after the session has been created, and measure the delay until receipt of the 200 OK message for the OPTIONS message. According to various example embodiments, sending of the OPTIONS message, and receipt of communications in response to the OPTIONS message, are included during session establishment with a far end device. Again, measuring the delay in this manner may be particularly useful when preconditions are not used. Further, in accordance with some example embodiments, the AS 106 may be configured to base the delay measurement on SIP messaging other than the initial INVITE, because the delay may be significantly higher than for subsequent re-INVITE messages, due to, for example, paging, home subscriber server querying, initial filter criteria execution, and the like.

If a single radio continuity transfer (e.g., a SRVCC) is desired for the ongoing session 104, the MSC 110 may be configured to send an INVITE message at 152 to the AS 106 with the session transfer number (STN). The INVITE or invitation message may be sent to the AS 106 via one or more networks in connection between the AS 106 and MSC 110. According to some example embodiments, the STN may be sent as defined in Technical Specification 23.216 entitled *Single Radio Voice Call Continuity (SRVCC); Stage* 2 (hereinafter referred to as "TS 23.216") which is herein incorporated by reference in its entirety. According to some example embodiments, the invitation sent at 152 is not an offerless SIP INVITE, which, in some instances, may add additional delay time to the transfer. In this regard, the invitation at 152 may include a session description protocol (SDP). Additionally, the MSC 110 may be configured to wait before sending a response to the MME 112, rather than sending a response to the MME 112 immediately.

The AS 106 may be configured to send a re-INVITE message at 154a to the far end UE 102 in response to receiving the INVITE message from the MSC 110. The AS 106 may also be configured to send the AS-FE delay value, that has been previously measured and stored, to the MSC 110 at 154b. The AS-FE delay value may be sent to the MSC 110 via one or more networks in connection between the AS 106 and MSC 110. After sending the INVITE message at 152, the MSC 110 may be configured to wait to receive the AS-FE delay value from the AS 106 at 154b. The I2 interface may be used to transmit the AS-FE delay value from the AS 106 to the MSC 110, which may require a SIP interface between the MSC 110 and the AS 106. The AS-FE delay value may be sent in a SIP request (e.g., an INFO message) or a SIP response which is generated by the AS 106 and not relayed from the far end UE 102. According to some example embodiments, the AS 106 may be configured to continue with a remove leg update as defined in TS 23.216.

Upon receiving the AS-FE delay value, the MSC 110 may determine or obtain a timer value based on the AS-FE delay value. The MSC 110 may be configured to implement a wait period via a wait timer for a duration indicated by the timer value at 156 (while the re-INVITE at 154a propagates to the far end UE 102). The timer value may be set to:

$$\text{timer value} = (AS\text{-}FE \text{ delay value}/2) -$$
$$(\text{estimated delay for local end transfer (e.g., 100 milliseconds)}),$$

where the AS-FE delay value is an RRT. For example, if the AS-FE delay value (RRT) for SIP signaling is 1.5 seconds, the timer value may be 650 milliseconds.

According to some example embodiments, the timer value may be further optimized to account for additional aspects that may impact synchronization between the local UE 100 and the far end UE 102 for the transfer. For example, the estimated media plane delays may be factored into the timer delay. Additionally, or alternatively, the MSC 110 may be configured to measure the delay between the AS 106 and the MSC 110 (e.g., for the INVITE message at 152) and the resultant MSC-AS delay may be factored into the timer value. Considering the MSC-AS delay may be particularly beneficial when MSC 110 and AS 106 are in different networks (e.g., when the local UE 100 is roaming). In this regard, the MSC 110 may be configured to measure the delay from the sending of the INVITE message to AS 106 at 152 until the reception of a response, such as the response providing the delay value at 154b. In this regard, the MSC 110 may implement a wait timer having a wait period indicated by a timer value of:

$$\text{timer value} = (AS\text{-}FE \text{ delay value}/2) -$$
$$(\text{estimated delay for local end transfer (e.g., 100 milliseconds)}) -$$
$$(MSC\text{-}AS \text{ delay value}/2),$$

where the delay values are RTTs. According to some example embodiments, if the MSC uses the initial INVITE for the measurement, the MSC-AS delay value should be divided by a number greater than 2, in order to compensate the faster traverse of the 200 OK message. Based on the foregoing, for example, if the AS-FE delay value for SIP signaling is 1.5 seconds, and the MSC-AS delay value is 200 milliseconds, the timer value is 550 milliseconds.

Upon conclusion of the wait period imposed by the wait timer (e.g., timer expires), MSC 110 may send a response to the MME 112 at 158 triggering the transfer of local UE 100. The MME 112 may be configured to send a handover command to the local UE 100 at 160a. The handover command may be sent to the local UE 100 via a wireless network such as an UTRAN or EUTRAN network. In some example embodiments, the MME 112 may respond to the transfer acknowledgment at 158 in the manner described in TS 23.216. The far end UE 102 may also receive the re-INVITE and respond with an acknowledgment to the AS 106 at 160b. As a result, in accordance with various example embodiments, the far end UE 102 may receive the re-INVITE and start to send media and other data packets at the same time, or at approximately the same time, as the local UE 100 tunes, for example, to the GERAN/UTRAN radio in the target access.

According to some example embodiments, rather than the MSC 110 implementing the wait timer, the AS 106 may implement the wait timer. In this regard, when the timer expires the AS 106 may send an indication to MSC 110 triggering the transfer, and MSC 110 may be configured to send the response, for example via the Sv interface, to MME 112 in response to the indication from the AS 106.

According to some example embodiments, a two-phase Handover Command may also be utilized. In this regard, a first handover command may be sent to the local UE 100 when the need for the transfer is first identified (e.g., consistent with SRVCC release 8 procedures). Subsequently, the second handover command may be sent as described above at 160a, at the conclusion of the wait period (e.g., when the timer expires).

Figure 2:
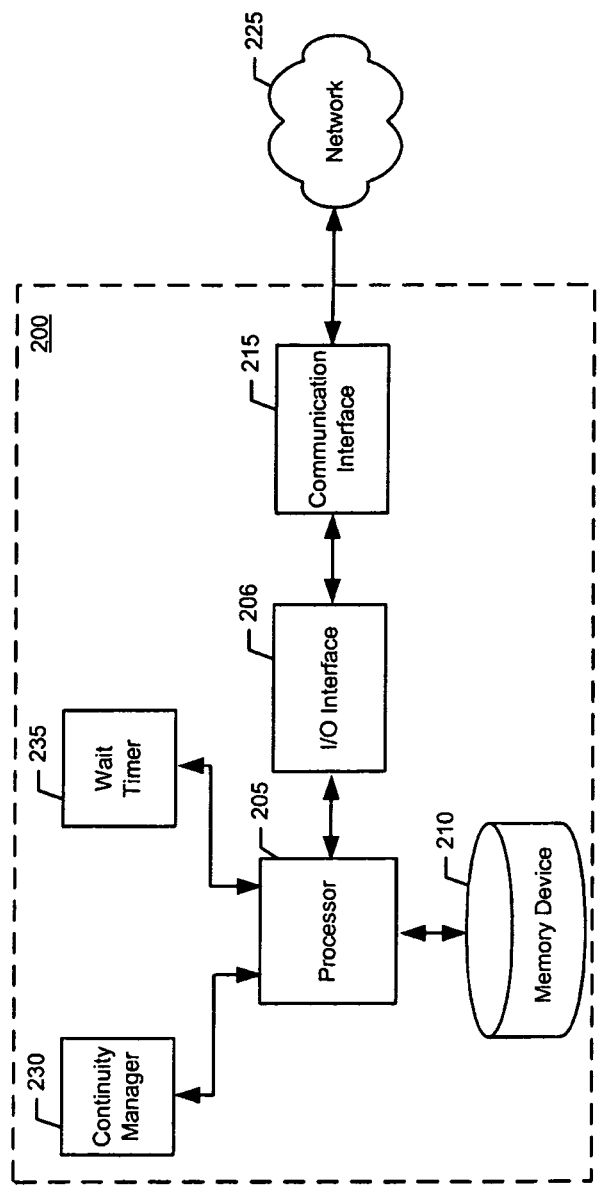
FIG. 2 illustrates an example apparatus and associated system configured to support implementation of a wait period for single radio continuity transfers according to an example embodiment of the present invention.

The description provided above and generally herein illustrates example methods, example apparatuses, and example computer program products for implementing a wait period for single radio continuity transfers. FIG. 2 depicts an example apparatus that is configured to perform various functionalities as described with respect to FIG. 1, and as generally described herein. According to some example embodiments, the apparatus 200 may be configured to perform the functionality of MSC 110 and/or AS 106 as described above. The example apparatus depicted in FIG. 2 may also be configured to perform example methods of the present invention, such as the example methods described with respect to FIGS. 1 and 3.

Referring now to FIG. 2, an example embodiment of the present invention is the apparatus 200. Apparatus 200 may, be embodied as, or included as a component of, a communications device with wired or wireless communications capabilities. In some example embodiments, the apparatus 200 may be part of a communications device, such as a stationary or a mobile communications terminal. As a stationary communications terminal, the apparatus 200 may be part of, or embodied as, a server, a computer, an access point (e.g., base station), communications switching device, or the like. As a mobile device, the apparatus 200 may be a mobile and/or wireless communications node such as, for example, a mobile and/or wireless server, computer, access point, communications switching device, handheld device (e.g., telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, a continuity manager 230, and a wait timer 235. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a communications server) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network 225 and/or any other device or module in communication with the example apparatus 200. The communications interface may be configured to communicate information via any type of wired or wireless connection, and via any type of communications protocol. Processor 205 may also be configured to facilitate communications via the communications interface by, for example, controlling hardware included within the communications interface 215. In this regard, the communication interface 215 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The continuity manager 230 and/or the wait timer 235 of example apparatus 200 may be any means or device embodied, partially or wholly, in hardware, a computer program product, or a combination of hardware and a computer program product, such as processor. 205 implementing stored instructions to configure the example apparatus 200, memory device 210 storing executable program code instructions configured to carry out the functions described herein, or a hardware configured processor 205 that is configured to carry out the functions of the continuity manager 230 and/or the wait timer 235 as described herein. In an example embodiment, the processor 205 includes, or controls, the continuity manager 230 and/or the wait timer 235. The continuity manager 230 and/or the wait timer 235 may be, partially or wholly, embodied as processors similar to, but separate from processor 205. In this regard, the continuity manager 230 and/or the wait timer 235 may be in communication with the processor 205. In various example embodiments, the continuity manager 230 and/or the wait timer 235 may, partially or wholly, reside on differing apparatuses such that some or all of the functionality of the continuity manager 230 and/or the wait timer 235 may be performed by a first apparatus, and the remainder of the functionality of the continuity manager 230 and/or the wait timer 235 may be performed by one or more other apparatuses.

The apparatus 200 and the processor 205 may be configured to perform the following functionality via the continuity manager 230 and the wait timer 235. In this regard, the continuity manager 230 and the wait timer 235 may be configured to cause the processor 205 and/or the apparatus 200 to perform various functionalities, such as those depicted in the flowchart of FIG. 3 and as generally described herein. In this regard, the continuity manager 230 may be configured to obtain a timer value at 300. The timer value may be based on a communications delay to a far end device. The communications delay to the far end device may be determined during session establishment with the far end device. In some example embodiments, the communications delay may be the delay between and application server and the far end device (e.g., far end user equipment). According to some example embodiments, obtaining the timer value may include receiving a delay value indicative of a communications delay to the far end device and subtracting an estimated duration for local end transfer to obtain the timer value. Further, according to some example embodiments, obtaining the timer value may include receiving a first delay value indicative of a communications delay between the far end device and an application server, determining a second delay value indicative of a communications delay between the applications server and a switching server, and subtracting an estimated duration for local end transfer and the second delay from the first delay to obtain the timer value.

In some example embodiments, the continuity manager 230 may be configured to obtain the timer value in response to an invitation message that includes a session description protocol. Additionally, or alternatively, the timer value may be based on the communications delay to the far end device, where the communications delay to the far end device was determined and caused to be stored prior to generation or reception of an invitation to begin the single radio continuity network transfer.

In response to obtaining the timer value, the wait timer 235 may be initialized and started. In this regard, the wait timer 235 may be configured to implement a wait period for the duration indicated by the timer value at 310. In response to completion of the wait period (e.g., wait timer 235 elapses), the continuity manager 230 may be configured to trigger a single radio continuity network transfer at 320. According to some example embodiments, the single radio continuity network transfer may involve a transfer of local user equipment from a packet switched domain to a circuit switched domain, or a transfer of the local user equipment from a circuit switched domain to a packet switched domain. Further, according to some example embodiments, the single radio continuity network transfer may be a single radio voice call continuity network transfer.

Figure 3:
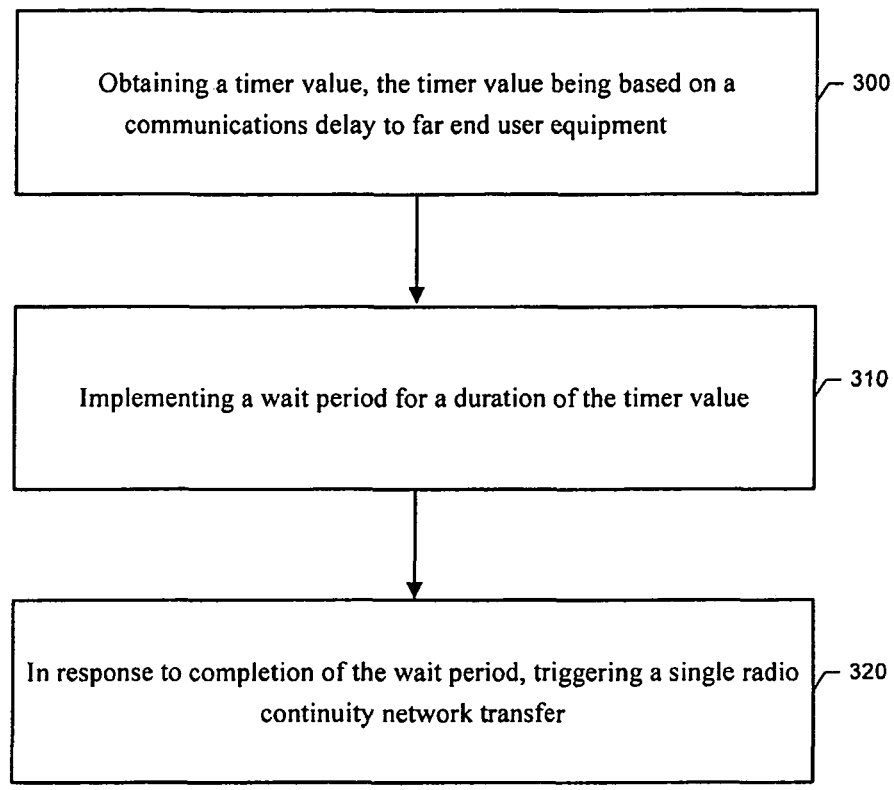
FIG. 3 illustrates a flow chart of a method for implementing a wait period for single radio continuity transfers according to an example embodiment of the present invention.

FIGS. 1 and 3 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving a first delay value indicative of a communications delay between a far end device and an application server;
determining a second delay value indicative of a communications delay between the applications server and a switching server;
subtracting an estimated duration for local end transfer and the second delay value from the first delay value to obtain a timer value, the communications delay to the far end device being determined during session establishment with the far end device;
implementing a wait period for a duration of the timer value; and
in response to completion of the wait period, triggering a single radio continuity network transfer.

2. The method of claim 1, wherein triggering the single radio continuity network transfer includes triggering the single radio continuity network transfer, the single radio continuity network transfer involving a transfer of local user equipment from a packet switched domain to a circuit switched domain, or a transfer of the local user equipment from a circuit switched domain to a packet switched domain.

3. The method of claim 1, wherein triggering the single radio continuity network transfer includes triggering the single radio continuity network transfer, the single radio continuity network transfer being a single radio voice call continuity network transfer.

4. The method of claim 1, wherein obtaining the timer value includes receiving a delay value indicative of a communications delay to the far end device and subtracting an estimated duration for local end transfer to obtain the timer value.

5. The method of claim 1, wherein obtaining the timer value includes obtaining the timer value in response to an invitation message that includes a session description protocol.

6. The method of claim 1, wherein obtaining the timer value includes obtaining the timer value, the timer value being based on the communications delay to the far end device, the communications delay to the far end device having been determined and caused to be stored prior to receiving an invitation to begin the single radio continuity network transfer.

7. An apparatus comprising at least one processor and at least one memory including computer program code, the at least one memory and the computer program code configured to, with the at least one processor, cause the apparatus at least to:
receive a first delay value indicative of a communications delay between a far end device and an application server;
determine a second delay value indicative of a communications delay between the applications server and a switching server:
subtract an estimated duration for local end transfer and the second delay value from the first delay value to obtain a timer value, wherein the communications delay to the far end device is determined during session establishment with the far end device;
implement a wait period for a duration of the timer value; and
in response to completion of the wait period, trigger a single radio continuity network transfer.

8. The apparatus of claim 7, wherein the single radio continuity network transfer further comprises one of a transfer of local user equipment from a packet switched domain to a circuit switched domain and a transfer of the local user equipment from a circuit switched domain to a packet switched domain.

9. The apparatus of claim 7, wherein the single radio continuity network transfer further comprises a single radio voice call continuity network transfer.

10. The apparatus of claim 7, wherein the at least one memory including computer program code is further configured to, with the at least one processor, further cause the apparatus to:
receive a delay value indicative of a communications delay to the far end device, wherein the timer value is further determined by subtracting an estimated duration for local end transfer from the delay value indicative of the communications delay to the far end device.

11. The apparatus of claim 7, wherein the timer value is obtained in response to an invitation message that includes a session description protocol.

12. The apparatus of claim 7, wherein the at least one memory including computer program code is further configured to, with the at least one processor, further cause the apparatus to:
receive an invitation to begin the single radio continuity network transfer, wherein the communications delay to the far end device is further determined before the invitation to begin the single radio continuity network transfer is received.

13. The apparatus of claim 7, wherein the apparatus further comprises a communications network server.

14. The apparatus of claim 7, wherein the apparatus further comprises communications circuitry configured to establish communications connections with network entities.

15. A computer program product comprising a non-transitory computer readable storage medium having computer program code stored thereon, the computer program code being configured to, when executed, cause an apparatus to perform:
receiving a first delay value indicative of a communications delay between a far end device and an application server;
determining a second delay value indicative of a communications delay between the applications server and a switching server;
subtracting an estimated duration for local end transfer and the second delay, the first delay to obtain a timer value, the communications delay to the far end device being determined during session establishment with the far end device;
implementing a wait period for a duration of the timer value; and
in response to completion of the wait period, triggering a single radio continuity network transfer.

16. The computer program product of claim 15, wherein the computer program code configured to cause the apparatus to perform triggering the single radio continuity network transfer includes being configured to cause the apparatus to perform triggering the single radio continuity network transfer, the single radio continuity network transfer involving a transfer of local user equipment from a packet switched domain to a circuit switched domain, or a transfer of the local user equipment from a circuit switched domain to a packet switched domain.

17. The computer program product of claim 15, wherein the computer program code configured to cause the apparatus to perform obtaining the timer value includes being configured to cause the apparatus to perform receiving a delay value indicative of a communications delay to the far end device and subtracting an estimated duration for local end transfer to obtain the timer value.

18. The computer program product of claim 15 wherein the computer program code configured to cause the apparatus to perform obtaining the timer value includes being configured to cause the apparatus to perform obtaining the timer value, the timer value being based on the communications delay to the far end device, the communications delay to the far end device having been determined and caused to be stored prior to receiving an invitation to begin the single radio continuity network transfer.

* * * * *

UNITED STATES PATENT AND TRADEMARK OFFICE
CERTIFICATE OF CORRECTION

PATENT NO.         : 9,137,711 B2
APPLICATION NO.    : 13/520879
DATED              : September 15, 2015
INVENTOR(S)        : Mutikainen Page 1 of 1

It is certified that error appears in the above-identified patent and that said Letters Patent is hereby corrected as shown below:

In the claims:

Column 14,
Line 46, claim 15, "second delay, the first delay" should read --second delay value from the first delay value--.

Signed and Sealed this
Fifteenth Day of March, 2016

Michelle K. Lee
*Director of the United States Patent and Trademark Office*